United States Patent
Bao

(10) Patent No.: US 12,219,926 B2
(45) Date of Patent: Feb. 11, 2025

(54) TESTING DEVICE FOR COGNITIVE ABILITY OF TUPAIA BELANGERI AND TESTING METHOD

(71) Applicant: Tianhao Bao, Kunming (CN)

(72) Inventor: Tianhao Bao, Kunming (CN)

( * ) Notice: Subject to any disclaimer, the term of this patent is extended or adjusted under 35 U.S.C. 154(b) by 114 days.

(21) Appl. No.: 18/062,223

(22) Filed: Dec. 6, 2022

(65) Prior Publication Data
US 2024/0130329 A1   Apr. 25, 2024
US 2024/0224939 A9   Jul. 11, 2024

(30) Foreign Application Priority Data

Oct. 24, 2022 (CN) .......................... 202211304745.8

(51) Int. Cl.
*A01K 15/02* (2006.01)
*A01K 1/03* (2006.01)
*A01K 29/00* (2006.01)

(52) U.S. Cl.
CPC ............ *A01K 15/02* (2013.01); *A01K 1/03* (2013.01); *A01K 29/005* (2013.01)

(58) Field of Classification Search
CPC ......... A01K 15/02; A01K 1/031; A01K 29/00
USPC .......................................... 340/573.1, 815.45
See application file for complete search history.

(56) References Cited

U.S. PATENT DOCUMENTS

| | | | | |
|---|---|---|---|---|
| 5,898,381 A * | 4/1999 | Gartner | .................. | G08G 1/095 340/815.45 |
| 2012/0180731 A1 * | 7/2012 | Garner | .................. | A01K 1/031 119/417 |

* cited by examiner

*Primary Examiner* — Jeffrey R Larsen
(74) *Attorney, Agent, or Firm* — Westbridge IP LLC

(57) ABSTRACT

Disclosed are a testing device for a cognitive ability of tupaia belangeri and a testing method. The testing device includes a life cage, a maze, a rest bin, a rolling door, a camera module and a control module, and further includes at least one of projection modules, a touch module and a loudspeaker; the maze is composed of a plurality of maze pipelines in mutual, vertical, horizontal and crossed connection, and an interior of an intersection is communicated; the maze communicates with the life cage and the rest bin respectively; the rolling door is arranged at the intersection of the maze pipelines; the projection modules and the camera module are all arranged in a center of the intersection of the maze pipelines.

1 Claim, 3 Drawing Sheets

TESTING DEVICE FOR COGNITIVE ABILITY OF TUPAIA BELANGERI AND TESTING METHOD

CROSS-REFERENCE TO RELATED APPLICATIONS

The application claims priority to Chinese Patent Application CN202211304745.8, filed on Oct. 24, 2022, which is incorporated herein by reference in its entirety.

TECHNICAL FIELD

The present disclosure relates to the technical field of tupaia belangeri feeding and learning cognitive ability testing, in particular to a testing device for a cognitive ability of tupaia belangeri and a testing method.

BACKGROUND

The tupaia belangeri belongs to Scandentia Tupaiidae, and between Insectivora and Primates in terms of the taxonomic status. Compared with experimental animal, such as a mice, a rat and a dog, its genetic relationship is closet to the Primates, and compared with Primates, it has been widely applied in the field of biopharmaceutical research due to the characteristics of small figure, short breeding cycle, easy experimental operation and low feeding cost. Some tupaia belangeri has fast movement, great movement range and is easy to die after drowning, and in the prior art, most of the testing devices for the cognitive ability of the tupaia belangeri will scare the tupaia belangeri, therefore the learning cognitive ability of the tupaia belangeri cannot be accurately determined due to formation of reference and single task.

The research on the cognitive ability of the tupaia belangeri is of great significance to the field of biopharmaceutical research of mental disease or emotional disorder. If the cognitive ability of the tupaia belangeri is tested and trained, the working efficiency of the research is not only improved, but also the breakthrough obtained in the field of biopharmaceutical research of mental disease or emotional disorder can be promoted.

SUMMARY

In order to solve or partially solve the problem in the related art, the present disclosure provides a testing device for a cognitive ability of tupaia belangeri and a testing method, which can be used for testing and training the cognitive ability of the tupaia belangeri for a figure, a shape, a color and a voice feature, so as to improve the recognition accuracy of the tupaia belangeri.

According to a first aspect, the present disclosure provides a testing device for a cognitive ability of tupaia belangeri, including:

a life cage, a maze, a rest bin, a rolling door, a camera module and a control module, and at least one of projection modules, a touch module and a loudspeaker;

the maze is composed of a plurality of maze pipelines in mutual, vertical, horizontal and crossed connection, an interior of the intersection is communicated, and the maze communicates with the life cage and the rest bin respectively;

the rolling door is arranged at an intersection of the maze pipelines;

the projection modules and the camera module are all arranged in a center of the intersection of the maze pipelines;

the touch module and the loudspeaker are all arranged on the rolling door;

the control module controls output of the projection modules and the loudspeaker;

the control module is configured to receive data of the camera module and/or the touch module and to control the rolling door;

the maze pipelines are transparent circular pipes, which are made of acrylic.

Preferably, a fixed rod is arranged in the center of the roof of the intersection of the maze pipelines, four sides of the fixed rod are all provided with the projection modules, which face to four sides of the intersection of the maze pipelines directly, so as to project information on the rolling door, and the camera module is located at a bottom end of the fixed rod.

Preferably, the projection modules can output different graphic symbols, which can be displayed in different colors.

Preferably, the graphic symbol includes a traffic prohibited sign, an arrow symbol indicating a right, an arrow symbol indicating a left and an arrow symbol indicating a front.

Preferably, the color includes red, yellow and green.

Preferably, each rolling door is correspondingly provided with one feeding site.

Preferably, the testing device further includes a first sensor and a second sensor, the first sensor is arranged on a pipeline inner wall of a left entrance of the maze pipeline, and the second sensor is arranged on a pipeline inner wall of a right entrance of the maze pipeline.

Preferably, the testing device further includes a communication module, which is connected to the control module, after a communication connection is established between the control module and the communication module, the control module controls the projection modules to output the graphic symbol, and the color of the graphic symbol can be controlled; the control module controls the loudspeaker to send out different sounds; and the control module controls the rolling of the rolling door.

According to a second aspect, the present disclosure provides a testing method for a cognitive ability of tupaia belangeri, and the testing method carried out through the testing device for the cognitive ability of the tupaia belangeri in the first aspect includes the following steps:

performing the testing preparation in S1-S2 in advance;

S1, determining a target testing position in advance and arranging an unique target channel between the target position and an entrance of a life cage, and selecting the target testing position at an intersection of maze pipelines;

S2, arranging a graphic symbol to be tested of the projection module, and/or a color of the graphic symbol, and/or a sound of a loudspeaker, and/or completing touch feedback at the target testing position according to the graphic symbol to be tested, and/or the color of the graphic symbol, and/or the sound, and/or the touch feedback, so that the graphic symbol to be tested, and/or the color of the graphic symbol are projected to the rolling door, and/or the loudspeaker at the target testing position sends out different sounds, and/or the touch module occurs a touch event;

after the above testing preparation is completed, the entrance of the life cage is opened, and the tupaia belangeri is in the life cage;

S3, when the tupaia belangeri runs out of the life cage from the entrance of the life cage and enters the maze pipeline, closing the entrance of the life cage and opening a left entrance and a right entrance of the maze pipeline, so that the tupaia belangeri reaches the target testing position through a target channel, where during the process that the tupaia belangeri reaches the target testing position through the target channel, the camera module catches a stay process and a behavior of the tupaia belangeri in a maximum angle range, and transmits the caught data to the control module, and the control module controls the rolling of the rolling door according to the received data;

S4, recording time that the tupaia belangeri reaches the rest bin from the life cage through the target testing position according to a first sensor and a second sensor, and judging the cognitive ability of the tupaia belangeri;

Preferably, in S4, if the tupaia belangeri can enter the rest bin from the life cage within 40 s, the tupaia belangeri has no cognitive ability injury.

If the tupaia belangeri enters the rest bin from the life cage within 40-55 s, the tupaia belangeri has mild cognitive ability injury.

If the tupaia belangeri enters the rest bin from the life cage within 55-180 s or cannot enter the rest bin, the tupaia belangeri has severe cognitive ability injury.

Through the above technical solution of the present disclosure, the following technical effects can be implemented:

1. The testing of the tupaia belangeri on the multi-task cognitive ability is implemented in manners that the projection modules capable of displaying the graphic symbol and the color of the graphic symbol, the loudspeaker capable of sending out different sounds and the touch module are arranged in the testing device, the tupaia belangeri is subjected to the stimulation of sound, color, image and shape, whether the tupaia belangeri can occur the touch event through the touch module, and the stay process, movement and behavior of the tupaia belangeri in the maze are recorded through the camera module, thereby judging the degree of the cognitive ability injury of the tupaia belangeri. Compared with the single-task cognitive ability testing device in the prior art, the multi-task cognitive ability testing device enables the cognitive ability testing data of the tupaia belangeri to be more accurate, and when carrying out the biopharmaceutical research for the human mental disease or emotional disorder, the testing data is more fitting to the degree judgment for the mental disease or emotional disorder, and therefore the multi-task cognitive ability testing device is of accurate guiding significance to the biopharmaceutical research.

2. In the present disclosure, the tupaia belangeri can be tested and trained for the shape cognitive ability, and at the same time, the projection modules can change the color and the shape so as to implement the testing of the tupaia belangeri for the color cognitive ability. The loudspeaker can send out different sounds, the touch module can occur the touch event, a plurality of repeat training can be carried out by using the testing method, so the recognition of the tupaia belangeri for the sound, light, power and touch feedback can be improved, and the trained tupaia belangeri is used in the field of the biopharmaceutical research, thereby improving the working efficiency of the research.

3. In the present disclosure, the rolling door, the camera module, the control module, the projection modules, the touch module and the loudspeaker are arranged in the testing device, and after the communication connection is established between the communication module and the control module, the control module can control the projection modules to display the graphic symbol, control the color of the graphic symbol, control the sound of the loudspeaker and roll the rolling door automatically, and the testing device is more intelligent. A baffle is not required to be replaced during a testing process, so the testing is more convenient and quick, thereby improving the testing efficiency and saving the testing time. The tupaia belangeri will not be scared during the testing process, to avoid forming a reference, and then its learning cognitive ability can be accurately confirmed.

It should be understood that general description above and the detailed description below are only illustrative and explanatory and do not restrict the present disclosure.

DETAILED DESCRIPTION OF THE EMBODIMENTS

The following clearly and completely describes the alternative implementation modes of the present disclosure with reference to the drawings. Although the drawings show alternative implementation modes of the present disclosure, it should be understood that the present disclosure can be implemented in various forms and shall not be limited by implementation modes described herein. On the contrary, providing these implementation modes is to understand the preset disclosure thoroughly, and the scope of the present disclosure can be completely conveyed to those skilled in the art.

Terms used in the present disclosure are only for the purpose of describing specific embodiments and not intended to limit the present disclosure. Singular forms "a/an", "said", and "the" in the present disclosure and the claims are also intended to include the plural forms, unless otherwise specified in the context. It is also understood that term "and/or" used herein includes one or any and all combinations of multiple related items which are listed.

It is understood that although the present disclosure may adopt terms "first", "second" and "third" for describing various information, these information should not be used for limiting these terms. These terms are merely used for distinguishing the same kind of information. For example, without deviating from the application scope of the present disclosure, the first information can be called as the second information, and similarly, the second information can also be called as the first information. Thus, the features defined with "first" and "second" may expressly or impliedly one or more features. In the description of the present disclosure, "a plurality of" means two or above two, unless specific limitation otherwise.

First, the testing device for the cognitive ability of the tupaia belangeri in the present disclosure is described in detail, as follows.

Embodiment 1

Figure 1:
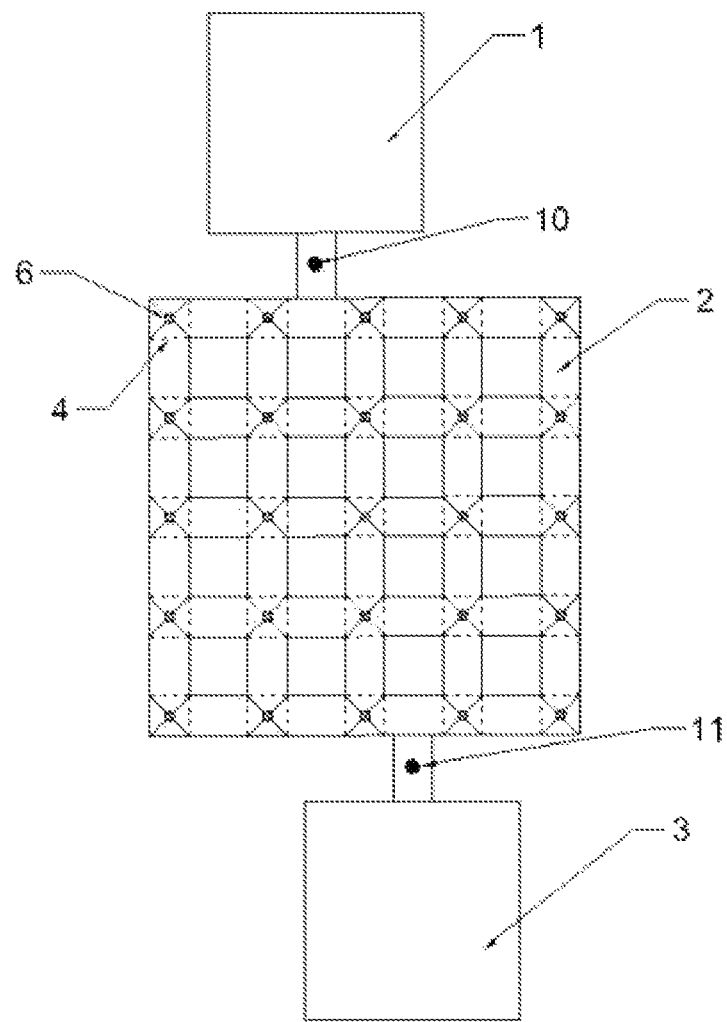
FIG. 1 is a schematic diagram of a composition structure of a testing device for a cognitive ability of tupaia belangeri in the present disclosure.

FIG. 1 is a schematic diagram of a composition structure of a testing device for a cognitive ability of tupaia belangeri in the present disclosure.

As shown in FIG. 1, the testing device for the cognitive ability of the tupaia belangeri of the present disclosure includes: a life cage 1, maze pipelines 2, a rest bin 3, a rolling door 4, a camera module 5, a control module, projection modules 7, a touch module 8 and a loudspeaker 9; the maze pipelines 2 are composed of transparent acrylic circular pipes in mutual, vertical, horizontal and crossed connection, an interior of an intersection is communicated, and a left entrance and a right entrance are provided; the left entrance of the maze pipelines 2 is connected to the entrance of the life cage 1, and the right entrance of the maze pipelines 2 is connected to the entrance of the rest bin 3; the rolling door 4 is arranged at the intersection of the maze pipelines; the projection modules 7 and the camera module 5 are all arranged in the center of the intersection of the maze pipelines 2; the touch module 5 and the loudspeaker 9 are all arranged on the rolling door 4; the control module controls the output of the projection modules 7 and the loudspeaker 9; and the control module is configured to receive data of the camera module 5 and/or the touch module 8 and to control the rolling door 4.

The size of the rolling door 4 is 11.5 cm×11.5 cm, the maze pipelines 2 are composed of eight transparent acrylic pipes in mutual, vertical, horizontal and crossed connection, the interior of the intersection is communicated, five transparent acrylic pipes are arranged longitudinally, and five transparent acrylic pipes are arranged vertically; a path has two-channel, three-channel and four-channel according to the mutual, vertical, horizontal and crossed connection of the acrylic pipes; the rolling door 4 is correspondingly arranged according to the quantity of the channel, and the touch module 8 and the loudspeaker 9 are arranged at a lower part of the rolling door 4; the touch module 8 is arranged at a lower position of the rolling door 4, and the touch is only avoided when the rolling door 4 rolls; and the quantity of the acrylic pipes forming the maze pipelines 2 may be 4, 6, 8, 10 or 12, which are not limited herein.

The control module controls the output of the projection modules 7 and the loudspeaker 9, and the control module is configured to receive data of the camera module 5 and/or the touch module 8 and to control the rolling door 4; and the conventional control method in the prior art is not repeated herein.

Figure 2:
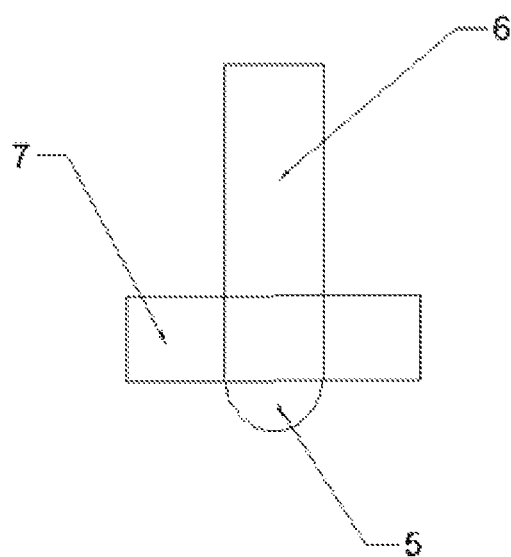
FIG. 2 is a schematic diagram of a composition structure of a fixed rod, projection modules and a camera module in FIG. 1 in the present disclosure.
Figure 3:
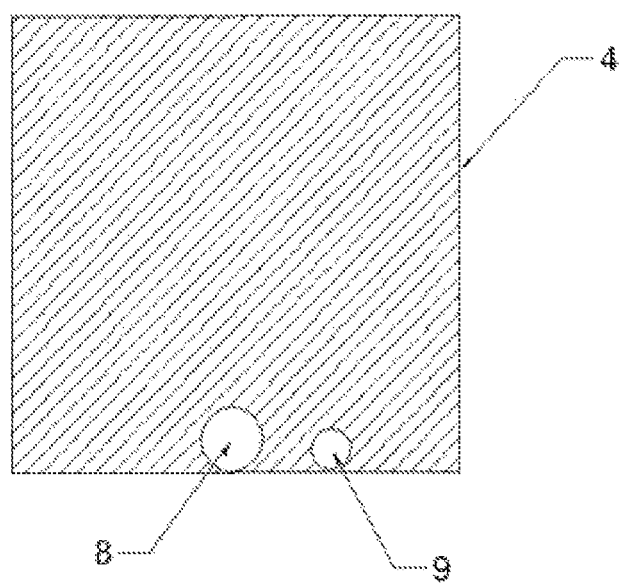
FIG. 3 is a schematic diagram of a composition structure of a rolling door, a touch module and a loudspeaker in FIG. 1 in the present disclosure.

Preferably, as shown in FIG. 2, in one implementation mode, a fixed rod 6 is arranged in the center of the roof of the intersection of the maze pipelines 2, the four sides of the fixed rod 6 are all provided with the projection modules 7, which face to the four sides of the intersection of the maze pipelines 2 directly, so as to project information on the rolling door 4, and the camera module is located at a bottom end of the fixed rod.

The projection modules 7 are four projectors arranged at four positions of the fixed rod 6, and information output from the projection modules 7 is projected to the upper part of the rolling door 4, thereby avoiding blocking the projection information on the rolling door 4 when the tupaia belangeri walks. When the path formed by the acrylic pipes in mutual, vertical, horizontal and crossed connection is a two-channel path, the rolling door 4 corresponding to the two channels is set to two effective projectors correspondingly, and the rest two projectors are invalid projectors. When the path formed by the acrylic pipes in mutual, vertical, horizontal and crossed connection is a three-channel path, the rolling door 4 corresponding to the three channels is set to three effective projectors correspondingly, and the rest one projector is the invalid projector. When the path formed by the acrylic pipes in mutual, vertical, horizontal and crossed connection is a four-channel path, the rolling door 4 corresponding to the four channels is set to four effective projectors correspondingly, and the rest one projector is the invalid projector. The two-channel path and the three-channel path are all provided with four projectors, thereby avoiding the formation of the reference to the tupaia belangeri and the inaccurate testing result.

Further, the projection modules 7 can output different graphic symbols, which can be displayed in different colors.

Preferably, the graphic symbol includes a traffic prohibited sign, an arrow symbol indicating the right, an arrow symbol indicating the left and an arrow symbol indicating the front.

When the tupaia belangeri is trained, the traffic prohibited sign means that no path ahead may reach the next circular pipe intersection of the maze pipeline 2, and at this time, the feeding site is the circular pipe intersection with the traffic prohibited sign; the arrow symbol indicating the right means that the next circular pipe intersection of the maze pipeline 2 may be reached from the right, and at this time, the feeding site is the next circular pipe intersection of the arrow symbol indicating the right; the arrow symbol indicating the left means that the next circular pipe intersection of the maze pipelines 2 can be reached from the left, and at this time, the feeding site the next circular pipe intersection of the left of the arrow symbol indicating the left; and the arrow symbol indicating the front means that the next circular pipe intersection of the maze pipelines 2 may be reached from the front, and at this time, the feeding site is the next circular pipe intersection of the circular pipe intersection with this sign.

Food will not be thrown during the testing after the training is finished, the traffic prohibited sign means that no path ahead may reach the next circular pipe intersection of the maze pipeline 2, the arrow symbol indicating the right means that the next circular pipe intersection of the maze pipeline 2 may be reached from the right; the arrow symbol indicating the left means that the next circular pipe intersection of the maze pipelines 2 can be reached from the left; and the arrow symbol indicating the front means that the next circular pipe intersection of the maze pipelines 2 may be reached from the front.

Preferably, the color of the graphic symbol includes red, yellow and green.

The projection modules 7 can output different graphic symbols, which can be displayed in different colors, so a plurality of solutions can be combined for testing the tupaia belangeri, and the testing method is flexible.

Preferably, each rolling door is correspondingly provided with one feeding site. The setting of the feeding site is convenient to use when training the cognitive ability of the tupaia belangeri; and after the training is finished, the testing of the cognitive ability can be carried out. For example, the yellow right arrow means food, etc.

Further, the testing device further includes a first sensor 10 and a second sensor 11, the first sensor 10 is arranged on a pipeline inner wall of a left entrance of the maze pipeline 2, and the second sensor 11 is arranged on a pipeline inner wall of a right entrance of the maze pipeline 2. In this design, when the tupaia belangeri walks below the first sensor 10, the started testing time of the tupaia belangeri is recorded; when the tupaia belangeri walks below the second sensor 11, the ended testing time of the tupaia belangeri is recorded; and thus the time that the tupaia belangeri passes through the maze is convenient to record, thereby judging its cognitive ability.

Further, the testing device further includes a communication module, which is connected to the control module, after a communication connection is established between the control module and the communication module, the control module controls the projection modules to output the graphic symbol, and the color of the graphic symbol can be controlled; the control module controls the loudspeaker to send out different sounds; and the control module controls the rolling of the rolling door. The control module is a control terminal module, and the terminal may be a cellphone or a computer.

A testing method for the cognitive ability of the tupaia belangeri by using the above device includes the following steps of:

performing the testing preparation in S1-S2 in advance;

S1, determining a target testing position in advance and arranging an unique target channel between the target position and an entrance of a life cage, and selecting the target testing position at an acrylic circular pipe intersection of the maze pipelines;

S2, arranging a graphic symbol to be tested of the projection module, the color of the graphic symbol, the sound of a loudspeaker, completing touch feedback at the target testing position according to the graphic symbol to be tested, the color of the graphic symbol, sound, the touch feedback, so that the graphic symbol to be tested, the color of the graphic symbol are projected to the rolling door, the loudspeaker at the target testing position sends out different sounds, the touch module occurs a touch event;

after the above testing preparation is completed, the entrance of the life cage is opened, and the tupaia belangeri is in the life cage;

S3, when the tupaia belangeri runs out of the life cage from the entrance of the life cage and enters the maze pipeline, closing the entrance of the life cage and opening a left entrance and a right entrance of the maze pipeline, so that the tupaia belangeri reaches the target testing position through a target channel, where during the process that the tupaia belangeri reaches the target testing position through the target channel, the camera module catches the stay process and behavior of the tupaia belangeri in a maximum angle range, and transmits the caught data to the control module, and the control module controls the rolling of the rolling door according to the received data;

S4, recording the time that the tupaia belangeri reaches the rest bin from the life cage through the target testing position according to a first sensor and a second sensor, and judging the cognitive ability of the tupaia belangeri.

The target channel may be generated by the control module randomly or manually.

If the tupaia belangeri enters the rest bin from the life cage within 40 s, the tupaia belangeri has no cognitive ability injury.

If the tupaia belangeri enters the rest bin from the life cage within 40-55 s, the tupaia belangeri has mild cognitive ability injury.

If the tupaia belangeri enters the rest bin from the life cage within 55-180 s or cannot enter the rest bin, the tupaia belangeri has severe cognitive ability injury.

The testing device in the present disclosure may be applied in the field of biopharmaceutical research for mental disease or emotional disorder. As shown in the testing, if the tupaia belangeri enters the rest bin from the life cage within 40 s, the tupaia belangeri has no cognitive ability injury; and if the cognitive ability of the tupaia belangeri is injured by applying medicine, the tupaia belangeri with injured cognitive ability is put into the testing device of the present disclosure, so as to verify the degree of the cognitive ability injury. The tupaia belangeri with injured cognitive ability takes the mental disease or emotional disorder medicine under research, after the medicine takes effect, the tupaia belangeri is subjected to the cognitive ability testing, to observe the recovery of its brain injury, and to prove the medicine feasibility. Compared with the testing device for the cognitive ability of the tupaia belangeri in the prior art, the device of the present disclosure can not only be used as a training device, but also be used as a testing device, and the testing cost is greatly reduced. Multi-task testing can be carried out, so the testing result is more accurate, effective and believable.

In addition, the tupaia belangeri with mild cognitive ability injury can be screened by setting a plurality of invalid cavities in the testing device. The invalid cavities are specially as follows: any information is not projected on all rolling doors at the mutual, vertical, horizontal and crossed connection of a certain acrylic pipe, the loudspeaker does not generate any sound, and the touch module does not occur a touch event. If the stimulation of the sound, color, image and figure of the invalid cavity is not found when the tupaia belangeri is at the entrance of the invalid cavity, and the testing is finished when the tupaia belangeri does not enter the invalid cavity; and the testing time is not prolonged, and it can preliminarily prove that the tupaia belangeri has no cognitive disorder. If the stimulation of the sound, color, figure and shape of the invalid cavity is not found when the tupaia belangeri is at the entrance of the invalid cavity, and the testing is finished when the tupaia belangeri enters the invalid cavity and returns to the testing channel; and the testing time is prolonged, and it can preliminarily prove that the tupaia belangeri has mild cognitive disorder. If the stimulation of the sound, color, figure and shape of the invalid cavity is not found when the tupaia belangeri is at the entrance of the invalid cavity; the tupaia belangeri enters the invalid cavity, does not return to the testing channel and stays in the invalid cavity for a long time, and the testing cannot be finished, and it can preliminarily prove that the tupaia belangeri has severe cognitive disorder.

Embodiment 2

A testing device for a cognitive ability of tupaia belangeri includes:

a life cage, maze pipelines, a rest bin, a rolling door, a camera module, a control module, projection modules and a touch module;

the maze pipelines are composed of transparent acrylic circular pipes in mutual, vertical, horizontal and crossed connection, the interior of the intersection is communicated, and a left entrance and a right entrance are provided;

the left entrance of the maze pipeline is connected to the entrance of the life cage, and the right entrance of the maze pipeline is connected to the entrance of the rest bin;

the rolling door is arranged at the intersection of the maze pipelines;

the projection modules and the camera module are all arranged in the center of the intersection of the maze pipelines;

the touch module is arranged on the rolling door;

the control module controls the output of the projection module;

the control module is configured to receive data of the camera module and the touch module and to control the rolling door.

Preferably, a fixed rod is arranged in the center of the roof of the intersection of the maze pipelines, the four sides of the fixed rod are all provided with the projection modules, which face to the four sides of the intersection of the maze pipelines directly, and the camera module is located at a bottom end of the fixed rod.

Preferably, the projection modules can output different graphic symbols, which can be displayed in different colors.

Preferably, the graphic symbol includes a traffic prohibited sign, an arrow symbol indicating the right, an arrow symbol indicating the left and an arrow symbol indicating the front.

Preferably, the color includes red, yellow and green.

Preferably, each rolling door is correspondingly provided with one feeding site.

Preferably, the testing device further includes a first sensor and a second sensor, the first sensor is arranged on a pipeline inner wall of the left entrance of the maze pipeline, and the second sensor is arranged on a pipeline inner wall of the right entrance of the maze pipeline.

Preferably, the testing device further includes a communication module, which is connected to the control module, after a communication connection is established between the control module and the communication module, the control module controls the projection modules to output the graphic symbol, and the color of the graphic symbol can be controlled; the control module controls the rolling of the rolling door.

A testing method carried out through the testing device for the cognitive ability of the tupaia belangeri includes the following steps of:

performing the testing preparation in S1-S2 in advance;

S1, determining a target testing position in advance and arranging an unique target channel between the target position and an entrance of a life cage, and selecting the target testing position at an acrylic circular pipe intersection of the maze pipelines;

S2, arranging a graphic symbol to be tested of the projection module, the color of the graphic symbol, completing touch feedback at the target testing position according to the graphic symbol to be tested, the color of the graphic symbol, the sound, the touch feedback, so that the graphic symbol to be tested, the color of the graphic symbol are projected to the rolling door, and the touch module occurs a touch event;

after the above testing preparation is completed, the entrance of the life cage is opened, and the tupaia belangeri is in the life cage;

S3, when the tupaia belangeri runs out of the life cage from the entrance of the life cage and enters the maze pipeline, closing the entrance of the life cage and opening a left entrance and a right entrance of the maze pipeline, so that the tupaia belangeri reaches the target testing position through a target channel, where during the process that the tupaia belangeri reaches the target testing position through the target channel, the camera module catches the stay process and behavior of the tupaia belangeri in a maximum angle range, and transmits the caught data to the control module, and the control module controls the rolling of the rolling door according to the received data;

S4, recording the time that the tupaia belangeri reaches the rest bin from the life cage through the target testing position according to a first sensor and a second sensor, and judging the cognitive ability of the tupaia belangeri;

Embodiment 3

A testing device for a cognitive ability of tupaia belangeri includes:

a life cage, maze pipelines, a rest bin, a rolling door, a camera module, a control module, projection modules;

the maze pipelines are composed of transparent acrylic circular pipes in mutual, vertical, horizontal and crossed connection, the interior of the intersection is communicated, and a left entrance and a right entrance are provided;

the left entrance of the maze pipeline is connected to the entrance of the life cage, and the right entrance of the maze pipeline is connected to the entrance of the rest bin;

the rolling door is arranged at the intersection of the maze pipelines;

the projection modules and the camera module are all arranged in the center of the intersection of the maze pipelines;

the control module controls the output of the projection module;

the control module is configured to receive data of the camera module and to control the rolling door;

Preferably, a fixed rod is arranged in the center of the roof of the intersection of the maze pipelines, the four sides of the fixed rod are all provided with the projection modules, which face to the four sides of the intersection of the maze pipelines directly, and the camera module is located at a bottom end of the fixed rod.

Preferably, the projection modules can output different graphic symbols, which can be displayed in different colors.

Preferably, the graphic symbol includes a traffic prohibited sign, an arrow symbol indicating the right, an arrow symbol indicating the left and an arrow symbol indicating the front.

Preferably, the color includes red, yellow and green.

Preferably, each rolling door is correspondingly provided with one feeding site.

Preferably, the testing device further includes a first sensor and a second sensor, the first sensor is arranged on a pipeline inner wall of the left entrance of the maze pipeline, and the second sensor is arranged on a pipeline inner wall of the right entrance of the maze pipeline.

Preferably, the testing device further includes a communication module, which is connected to the control module, after a communication connection is established between the control module and the communication module, the control module controls the projection modules to output the graphic symbol, and the color of the graphic symbol can be controlled; and the control module controls the rolling of the rolling door.

A testing method carried out by the testing method for the cognitive ability of the tupaia belangeri includes the following steps of:

performing the testing preparation in S1-S2 in advance;

S1, determining a target testing position in advance and arranging an unique target channel between the target position and an entrance of a life cage, and selecting the target testing position at an acrylic circular pipe intersection of the maze pipelines;

S2, arranging a graphic symbol to be tested of the projection module, the color of the graphic symbol at the target testing position according to the graphic symbol to be tested, and the color and sound of the graphic symbol, so that the graphic symbol to be tested, and the color of the graphic symbol are projected to the rolling door;

after the above testing preparation is completed, the entrance of the life cage is opened, and the tupaia belangeri is in the life cage;

S3, when the tupaia belangeri runs out of the life cage from the entrance of the life cage and enters the maze pipeline, closing the entrance of the life cage and opening a left entrance and a right entrance of the maze pipeline, so that the tupaia belangeri reaches the target testing position through a target channel, where during the process that the tupaia belangeri reaches the target testing position through the target channel, the camera module catches the stay process and behavior of the tupaia belangeri in a maximum angle range, and transmits the caught data to the control module, and the control module controls the rolling of the rolling door according to the received data;

S4, recording the time that the tupaia belangeri reaches the rest bin from the life cage through the target testing position according to a first sensor and a second sensor, and judging the cognitive ability of the tupaia belangeri;

In the present disclosure, the testing can be carried out from the single-task testing mode to the multi-task testing mode, and the testing task can be selected according to the needs; and a plurality of testing task and a plurality of target channels may be combined according to the device in the present disclosure.

Various embodiments of the present disclosure have been described above, and the above specification is only exemplary instead of exhaustive, and not used to limit various disclosed embodiments. Without deviating from the scope and spirit of various embodiments of the present disclosure, many modifications and changes are apparent to those of ordinary skill in the art. The selection of the terms in the text is intended to explain the principle and actual application of each embodiment or the improvement of the technology in the market, or enable other ordinary skill in the art to understand various embodiments disclosed in this text.

What is claimed is:

1. A testing method carried out through a testing device for a cognitive ability of tupaia belangeri, wherein the testing device for the cognitive ability of the tupaia belangeri comprises a life cage, a maze, a rest bin, a rolling door, a camera module and a control module, and further comprising at least one of a touch module, a loudspeaker and projection modules;

the maze is composed of a plurality of maze pipelines in mutual, vertical, horizontal and crossed connection, an interior of an intersection is communicated, and the maze communicates with the life cage and the rest bin respectively;

the rolling door is arranged at the intersection of the maze pipelines;

the projection modules and the camera module are all arranged in a center of the intersection of the maze pipelines;

the touch module and the loudspeaker are all arranged on the rolling door;

the control module controls output of the projection modules and the loudspeaker; and the control module is configured to receive data of the camera module and/or the touch module and to control the rolling door;

wherein the testing method comprises the following steps:

S1, determining a target testing position in advance and arranging an unique target channel between the target position and an entrance of the life cage, and selecting the target testing position at the intersection of maze pipelines;

S2, arranging a graphic symbol to be tested of the projection module, and/or a color of the graphic symbol, and/or a sound of the loudspeaker, and/or completing touch feedback at the target testing position according to the graphic symbol to be tested, and/or the color of the graphic symbol, and/or the sound, and/or the touch feedback, so that the graphic symbol to be tested, and/or the color of the graphic symbol are projected to the rolling door, and/or the loudspeaker at the target testing position sends out different sounds, and/or the touch module occurs a touch event occurs on the touch module;

wherein after an above testing preparation is completed, the entrance of the life cage is opened, and the tupaia belangeri is in the life cage;

S3, when the tupaia belangeri runs out of the life cage from the entrance of the life cage and enters the maze pipelines, closing the entrance of the life cage and opening the maze pipelines, so that the tupaia belangeri reaches the target testing position through the unique target channel, wherein during the process that the tupaia belangeri reaches the target testing position through the unique target channel, the camera module catches a stay process and a behavior of the tupaia belangeri in a maximum angle range, and transmits caught data to the control module, and the control module controls the rolling of the rolling door according to the received data; and S4, recording time that the tupaia belangeri reaches the rest bin from the life cage through the target testing position according to a first sensor and a second sensor, and judging the cognitive ability of the tupaia belangeri;

wherein in S4, if the tupaia belangeri enters the rest bin from the life cage within 40 s, the tupaia belangeri has no cognitive ability injury;

if the tupaia belangeri enters the rest bin from the life cage within 40-55 s, the tupaia belangeri has mild cognitive ability injury; and if the tupaia belangeri enters the rest bin from the life cage within 55-180 s or is incapable of entering the rest bin, the tupaia belangeri has severe cognitive ability injury.

* * * * *